(12) United States Patent
Kang et al.

(10) Patent No.: US 7,863,494 B2
(45) Date of Patent: Jan. 4, 2011

(54) HYDROCARBON STEAM CRACKING CATALYST, METHOD FOR PREPARING THE SAME AND METHOD FOR PREPARING LIGHT OLEFIN BY USING THE SAME

(75) Inventors: Jun-han Kang, Chungcheongnam-do (KR); Won-ho Lee, Daejeon (KR); Sang-mun Jeong, Daejeon (KR); Sang-ku Park, Seoul (KR); Jong-hyun Chae, Daejeon (KR)

(73) Assignees: LG Chem, Ltd., Seoul (KR); LG Petrochemical Co., Ltd., Jeollanam-Do (KR)

( * ) Notice: Subject to any disclaimer, the term of this patent is extended or adjusted under 35 U.S.C. 154(b) by 1062 days.

(21) Appl. No.: 10/558,097

(22) PCT Filed: May 7, 2004

(86) PCT No.: PCT/KR2004/001068

§ 371 (c)(1),
(2), (4) Date: Dec. 6, 2006

(87) PCT Pub. No.: WO2004/105939

PCT Pub. Date: Dec. 9, 2004

(65) Prior Publication Data

US 2007/0106105 A1     May 10, 2007

(30) Foreign Application Priority Data

May 27, 2003  (KR) .................. 10-2003-0033860

(51) Int. Cl.
*C07C 4/06* (2006.01)
(52) U.S. Cl. .................... 585/652; 585/653; 208/114; 208/130; 208/120.25; 208/120.15
(58) Field of Classification Search ............... 585/652, 585/653; 208/114, 130, 120.15, 120.25; 502/208, 341, 344, 243, 251
See application file for complete search history.

(56) References Cited

U.S. PATENT DOCUMENTS

| | | | |
|---|---|---|---|
| 3,852,188 A * | 12/1974 | Dugan et al. | ................. 208/114 |
| 4,356,338 A | 10/1982 | Young | |
| 4,411,777 A | 10/1983 | McKay | |
| 4,977,122 A | 12/1990 | Eberly | |
| 5,035,872 A | 7/1991 | Löblich et al. | |
| 5,380,690 A | 1/1995 | Zhicheng et al. | |
| 6,211,104 B1 | 4/2001 | Shi et al. | |
| 6,566,293 B1 | 5/2003 | Vogt et al. | |
| 2005/0080308 A1 * | 4/2005 | Jeong et al. | ................. 585/653 |

FOREIGN PATENT DOCUMENTS

| | | |
|---|---|---|
| EP | 0 212 320 | 3/1987 |
| EP | 0 403 141 | 12/1990 |
| EP | 1 463 581 B1 | 2/2006 |
| GB | 1 397 729 | 6/1975 |
| GB | 2 330 137 A | 4/1999 |
| SU | 1011236 | 9/1981 |
| WO | WO 96/35647 | 11/1996 |
| WO | WO 2004/016352 A1 | 2/2004 |

OTHER PUBLICATIONS

Liang et al., "$AlPO_4$ Tridynnite Stabilized with $KMgPO_4$,", Mat. Res. Bull., vol. 20, pp. 1253-1256, 1985.

* cited by examiner

*Primary Examiner*—Tam M Nguyen
(74) *Attorney, Agent, or Firm*—McKenna Long & Aldridge LLP

(57) ABSTRACT

Provided are a catalyst for hydrocarbon steam cracking for light olefin production and a method for preparing the same. The catalyst is a simple $KMgPO_4$ catalyst, a supported $KMgPO_4$ catalyst, or a $KMgPO_4$-sintered catalyst. The supported $KMgPO_4$ catalyst is prepared by impregnating a carrier with an aqueous solution of a $KMgPO_4$ precursor and the $KMgPO_4$-sintered catalyst is prepared by mixing a $KMgPO_4$ powder or a $KMgPO_4$ precursor powder with metal oxide followed by sintering. Provided is also a method for producing light olefins such as ethylene and propylene by steam cracking in the presence of the catalyst. When the catalyst comprising $KMgSO_4$ as a catalytic component is used in olefin production, the yield of olefins is increased and the amount of cokes deposited on the catalyst is reduced.

13 Claims, No Drawings

HYDROCARBON STEAM CRACKING CATALYST, METHOD FOR PREPARING THE SAME AND METHOD FOR PREPARING LIGHT OLEFIN BY USING THE SAME

This application claims priority to PCT/KR2004/001068 filed on May 7, 2004, and Korean Application No. 10-2003-0033860 filed May 27, 2003, in Korea, all of which are hereby incorporated by reference in their entirety.

TECHNICAL FIELD

The present invention relates to a catalyst for hydrocarbon steam cracking for light olefin production and a method for preparing the same. More particularly, the present invention relates to a catalyst for hydrocarbon steam cracking for light olefin production, which has excellent thermal stability at high temperature and can reduce the amount of cokes deposited on the surface of the catalyst and increase the yield of light olefins when producing light olefins by hydrocarbon steam cracking, and a method for preparing the same. The present invention also relates to a method for producing light olefins using the catalyst.

BACKGROUND ART

Ethylene and propylene are important fundamental raw materials for petrochemical products. Ethylene and propylene are mainly produced by thermally cracking paraffin-based hydrocarbons, such as natural gases, naphthas, and gas oils, at a high temperature of 800° C. or more, in the presence of steam. To increase the yield of olefins such as ethylene and propylene in the steam cracking of hydrocarbons, a higher conversion rate of hydrocarbons or a higher selectivity of olefins are required. However, such a steam cracking process alone has limitations on increasing the conversion rate of hydrocarbons or the selectivity of olefins. In this regard, various methods capable of increasing the yield of olefins have been suggested.

As a method for increasing the yield of ethylene and propylene by the steam cracking of hydrocarbons, a catalytic steam cracking process has been suggested.

There are known a catalyst including magnesium oxide and zirconium oxide (U.S. Pat. No. 3,644,557), a catalyst consisting essentially of calcium aluminate (U.S. Pat. No. 3,969,542), a zirconia oxide supported manganese oxide catalyst (U.S. Pat. No. 4,111,793), a magnesium oxide supported iron catalyst (European Patent No. 0212320 A2), and a method for producing olefins using a catalyst including barium oxide, alumina, and silica (U.S. Pat. No. 5,600,051). However, these catalysts have a common problem in that excessive catalyst coking occurs during steam cracking of hydrocarbons.

Decomposition of hydrocarbons at a high temperature generates excessive cokes. To remove such cokes, steam is used as a diluent for reactants. However, cokes are still excessively generated and accumulated on reactor walls, which causes various problems. That is, cokes deposited on a wall surface of a cracking tube increase a thermal transfer resistance, thereby decreasing the amount of thermal transfer to hydrocarbons. Furthermore, the increase of a thermal transfer resistance leads to further heating of a reactor to supply a sufficient thermal energy necessary for cracking reaction, which increases the surface temperature of the reactor, thereby reducing the expected life span of the reactor. In addition, the cokes deposited the wall surface of the reactor decrease an effective sectional area of the reactor, thereby increasing a differential pressure of the reactor. As a result, more energy for compressing and supplying reactants is required.

As described above, cokes generated in steam cracking of hydrocarbons increase a thermal transfer resistance and a differential pressure, which inhibits normal operation of a reactor. For normal operation of a reactor, the operation of the reactor should be suspended to remove cokes. In particular, when a catalyst is used in steam cracking of hydrocarbons, cokes are accumulated not only on a wall surface of a reactor but also on a catalyst surface. In this regard, a coking problem may worsen in the case of using a catalyst in steam cracking of hydrocarbons. Cokes accumulated on a catalyst surface lowers the performance of the catalyst, and at the same time, rapidly increase a differential pressure applied to a catalyst bed. For this reason, the operation of a reactor should be more frequently suspended for normal operation of the reactor. A catalyst surface serves to capture and condense cokes precursors formed in a vapor phase. Some catalyst components have activity facilitating cokes formation. In this regard, a catalyst for hydrocarbon steam cracking must have a property capable of maximally preventing coking.

With respect to commercially available steam cracking reactors, generally, cokes removal is performed at an interval of 30-60 days. For this, the operation of the reactor is suspended and cokes are burned off with air blowing under a steam atmosphere. A time required for cokes removal varies according to the amount of cokes accumulated in a reactor. Generally, cokes removal takes 1-2 days. However, a use of a catalyst with poor cokes removal performance may significantly increase the number of cokes removals. Even though a use of such a catalyst may increase the yield of ethylene and propylene, the production of ethylene and propylene per unit time may be reduced, relative to that in a simple cracking process. Furthermore, additional costs for cokes removal may increase significantly. In this regard, to perform a catalytic steam cracking process of hydrocarbons in a cost effective manner, a catalyst capable of decreasing the number of cokes removals by minimization of catalyst coking is required.

U.S. Pat. No. 3,872,179 discloses a zirconia catalyst containing alkaline metal oxide and Russian Patent No. 1,011,236 discloses a boron oxide-grafted potassium vanadate catalyst supported on an alumina carrier. These patents relate to cokes removal via gasification to reduce coking on a surface of a catalyst. The alkaline metal oxide and potassium vanadate serve to convert cokes to $CO_x$ via gasification, which is very effective in cokes removal. Furthermore, an increase of a loading amount of the catalysts enhances the performance of cokes removal and decreases the number of cokes removals. However, the alkaline metal oxide and potassium vanadate may be present in a liquid phase in a hot cracker due to their low melting point. Therefore, during fast flow of reaction gases, catalyst components may be dissipated by volatilization with time, thereby decreasing the lifespan of a catalyst. To compensate for such a catalyst loss, addition of catalyst components during cracking reaction is necessary.

DISCLOSURE

In view of the above problems, the present invention provides a catalyst for hydrocarbon steam cracking for olefin production, which has excellent thermal stability at high temperature and can reduce the amount of cokes deposited on the surface of the catalyst and increase the yield of olefins.

The present invention also provides a method for preparing a catalyst including $KMgPO_4$ as a catalyst component, in detail, a method for preparing a supported catalyst, which includes impregnating a carrier with an aqueous solution of a $KMgPO_4$ precursor, and a method for preparing a sintered catalyst, which includes mixing a $KMgPO_4$ powder or a $KMgPO_4$ precursor powder with metal oxide followed by sintering.

The present invention also provides a method for producing olefins by steam cracking of hydrocarbons in the presence of the catalyst.

The above and other objects of the present invention can be accomplished by embodiments of the present invention as will be described hereinafter.

According to an aspect of the present invention, there is provided a catalyst for hydrocarbon steam cracking, which includes $KMgPO_4$ as a catalyst component. In addition, the present invention provides a supported catalyst in which $KMgPO_4$ is supported on a carrier. The carrier may be selected from the group consisting of alpha-alumina, silica, silica-alumina, zirconium oxide, magnesium oxide, magnesium aluminate, calcium aluminate, and zeolite.

A content of $KMgPO_4$ in the supported catalyst may be in a range of 0.5-30 wt %, based on the total weight of the supported catalyst. $KMgPO_4$ may be derived from a $KMgPO_4$ precursor prepared from magnesium nitrate hydrate, potassium hydroxide, and ammonium phosphate.

The supported catalyst is prepared by dissolving a $KMgPO_4$ precursor in water to prepare an aqueous solution of the $KMgPO_4$ precursor and impregnating a carrier with the aqueous solution of the $KMgPO_4$ precursor. The method may further include sintering the supported catalyst. The sintering may be carried out at 1,000-1,400° C. for 22-26 hours.

In the preparation method of the supported catalyst, the $KMgPO_4$ precursor may be prepared from magnesium nitrate hydrate, potassium hydroxide, and ammonium phosphate, and the carrier may be selected from the group consisting of alpha-alumina, silica, silica-alumina, zirconium oxide, magnesium oxide, magnesium aluminate, calcium aluminate, and zeolite.

In addition, the present invention provides a sintered catalyst obtained by sintering a $KMgPO_4$ powder or a $KMgPO_4$ precursor powder and metal oxide. A content of $KMgPO_4$ in the sintered catalyst may be in a range of 0.5-50 wt %, based on the total weight of the sintered catalyst. The metal oxide may be selected from the group consisting of alpha-alumina, silica, silica-alumina, zirconium oxide, magnesium oxide, magnesium aluminate, calciumaluminate, andzeolite. The $KMgPO_4$ precursor may be prepared from magnesium nitrate hydrate, potassium hydroxide, and ammonium phosphate.

The sintered catalyst is prepared by mixing a $KMgPO_4$ powder or a $KMgPO_4$ precursor powder and metal oxide, and sintering the resultant mixture. The sintering may be carried out at 1,000-1,400° C. for 22-26 hours.

In the preparation method of the sintered catalyst, the metal oxide may be selected from the group consisting of alpha-alumina, silica, silica-alumina, zirconium oxide, magnesium oxide, magnesium aluminate, calcium aluminate, and zeolite.

According to another aspect of the present invention, there is provided a method for producing olefins by steam cracking of hydrocarbons in the presence of a catalyst selected from the group consisting of the catalyst comprising $KMgPO_4$ as a catalytic component, the supported catalyst and the sintered catalyst. The catalyst may be regenerated by removal of cokes formed on a surface of the catalyst at 500-1,300° C. in the presence of air, steam, or a mixture thereof, after the steam cracking.

The steam cracking may be carried out at a reaction temperature of 600-1000° C., a weight ratio of steam/hydrocarbons of 0.3-1.0, and LHSV (Liquid Hourly Space Velocity) of 1-20 $hr^{-1}$.

The steam cracking may be carried out in a reactor selected From the group consisting of a fixed-bedreactor, afluidized-bed reactor, and a mobile phase reactor.

Hereinafter, the present invention will be described in detail.

According to the present invention, there are three forms of a catalyst for hydrocarbon steam cracking including $KMgPO_4$ as a catalyst component: (a) $KMgPO_4$ per se; (b) a supported catalyst in which $KMgPO_4$ is supported on a carrier; and (c) a sintered catalyst obtained by sintering a mixture of $KMgPO_4$ and magnesium aluminate.

With respect to the supported catalyst in which $KMgPO_4$ is supported on a carrier, a content of $KMgPO_4$ is in a range of 0.5-30 wt %, basedonthe total weight of the supportedcatalyst. If the content of $KMgPO_4$ is less than 0.5 wt %, a catalytic effect may be insufficient. On the other hand, if it exceeds 30 wt %, a catalytic effect corresponding to the content of $KMgPO_4$ may not be obtained.

The carrier as used herein may be a carrier commonly used in the pertinent art, such as alpha-alumina, silica, silica-alumina, zirconium oxide, magnesium oxide, magnesium aluminate, calcium aluminate, and zeolite. Preferred is alumina with a surface area of 0.1 $m^2/g$ or less.

The supported catalyst may be prepared as follows: first, magnesium nitrate hydrate, potassium hydroxide, and ammonium phosphate, which are precursor components of $KMgPO_4$, are dissolved in water to obtain an aqueous solution. Then, the aqueous solution is impregnated into alpha-alumina by incipient impregnation or liquid phase impregnation, followed by drying at 120° C. for 10 hours or more. The preparation method of the supported catalyst may further include sintering a $KMgPO_4$-impregnated carrier at high temperature to immobilize $KMgPO_4$ on the carrier. Preferably, the sintering may be carried out at 1,000-1,400° C., for 22-26 hours. In particular, if the sintering temperature exceeds 1,400° C., $KMgPO_4$ may be melted, thereby leading to the loss of $KMgPO_4$.

With respect to the sintered catalyst obtained by sintering a mixture of $KMgPO_4$ and metal oxide, a content of $KMgPO_4$ is in a range of 0.5-50 wt %, based on the total weight of the sintered catalyst. If the content of $KMgPO_4$ is less than of 0.5 wt %, a catalytic effect may be insufficient. On the other hand, if it exceeds 50 wt %, a catalytic effect corresponding to the content of $KMgPO_4$ may not be obtained.

The metal oxide as used herein may be selected from the group consisting of alpha-alumina, silica, silica-alumina, zirconium oxide, magnesium oxide, magnesium aluminate, calcium aluminate, and zeolite.

The sintered catalyst may be prepared as follows: a $KMgPO_4$ powder or a $KMgPO_4$ precursor powder obtained from magnesium nitrate hydrate, potassium hydroxide, and ammonium phosphate, is physically mixed with the metal oxide, sintered at high temperature, and formed in a predetermined shape. At this time, the sintering may be carried out at 1,000-1,400° C. for 22-24 hours. If the sintering temperature exceeds 1,400° C., $KMgPO_4$ may be evaporated, thereby leading to the loss of $KMgPO_4$.

The present invention provides a method for producing olefins by steam cracking of hydrocarbons in the presence of a catalyst selected from the group consisting of the catalyst comprising $KMgPO_4$ as a catalytic component, the supported catalyst, and the sintered catalyst. At this time, the steam cracking is carried out under a common steam cracking condition. That is, the steam cracking is carried out in the presence of the catalyst for hydrocarbon steam cracking under conditions of a reaction temperature of 600-1,000° C., a weight ratio of steam/hydrocarbons of 0.3-1.0, and LHSV (Liquid Hourly Space Velocity) of 1-20 hr$^{-1}$.

A reactor that can be used in the steam cracking of hydrocarbons may be a fixed-bed reactor, a fluidized-bed reactor, or a mobile phase reactor. When the steam cracking of hydrocarbons is carried out in a fixed-bed reactor, an alpha alumina-supported $KMgPO_4$ catalyst is used. The catalyst can be formed in a LASIK ring shape or other specific shapes.

Cokes formed on a catalyst containing $KMgPO_4$ during steam cracking of hydrocarbons are removed by heating at 500-1,300° C. in the presence of air, steam, or a mixture thereof.

Hereinafter, the present invention will be described more specifically by Examples and Comparative Examples. However, the following Examples are provided only for illustrations and thus the present invention is not limited to or by them.

BEST MODE

Example 1

Alpha-alumina was used as a carrier for catalyst preparation and had the following physical properties: spherical shape, diameter of 5 mm, surface area of 0.04 m$^2$/g, porosity of 21.89%, and average pore size of 19.76 nm. 155.8 g of magnesium nitrate hydrate, 34.1 g of potassium hydroxide, and 70.0 g of ammonium phosphate, which were precursor components of $KMgPO_4$, were dissolved in 100 g of water to obtain an aqueous solution. The aqueous solution was impregnated into 100 g of the alpha-alumina by incipient impregnation. The resultant supported catalyst was dried in an oven of 110° C. for 10 hours or more and then sintered at 1,000° C. for 24 hours. The sintered catalyst contained 15 wt % of $KMgPO_4$, based on the weight of the alpha-alumina, as presented in Table 2 below.

Example 2

A sintered catalyst was prepared in the same manner as in Example 1 except that the sintering temperature was 1,100° C. The sintered catalyst contained 15 wt % of $KMgPO_4$, based on the weight of the alpha-alumina, as presented in Table 2 below.

Example 3

A sintered catalyst was prepared in the same manner as in Example 1 except that the sintering temperature was 1,200° C. The sintered catalyst contained 15 wt % of $KMgPO_4$, based on the weight of the alpha-alumina, as presented in Table 2 below.

Example 4

A sintered catalyst was prepared in the same manner as in Example 1 except that 102.8 g of magnesium nitrate hydrate, 22.5 g of potassium hydroxide, and 46.2 g of ammonium phosphate were used and the sintering temperature was 1,200° C. The sintered catalyst contained 10 wt % of $KMgPO_4$, based on the weight of the alpha-alumina, as presented in Table 2 below.

Example 5

A sintered catalyst was prepared in the same manner as in Example 1 except that 207.2 g of magnesium nitrate hydrate, 45.3 g of potassium hydroxide, and 93.1 g of ammonium phosphate were used and the sintering temperature was 1,200° C. The sintered catalyst contained 20 wt % of $KMgPO_4$, based on the weight of the alpha-alumina, as presented in Table 2 below.

Comparative Example 1

Steam cracking of naphthas was performed in the absence of a catalyst.

Comparative Example 2

Alpha-alumina was used as a carrier for catalyst preparation and had the following physical properties: spherical shape, diameter of 5 mm, surface area of 0.04 m$^2$/g, porosity of 21.89%, and average pore size of 19.76 nm. 4.06 g of potassium hydroxide, 8.48 g of ammonium vanadate, and 3.54 g of boric acid, which were precursor components of potassium vanadate, were dissolved in 40 g of water to obtain an aqueous solution. The aqueous solution was impregnated into 100 g of the alpha-alumina by incipient impregnation. The impregnated alpha-alumina was dried in an oven of 110° C. in an air atmosphere for 10 hours or more and sintered in a sintering furnace at 750° C. for 4 hours. The sintered catalyst thus prepared contained 10 wt % of potassium vanadate and 2 wt % of boron oxide, based on the weight of the alpha-alumina.

Comparative Example 3

12.6 g of potassium phosphate hydrate ($K_3PO_4.1H_2O$), which was a precursor of potassium phosphate, was dissolved in 40 g of water to obtain an aqueous solution. The aqueous solution was impregnated into 100 g of the alpha-alumina of Comparative Example 2 by incipient impregnation. The resultant supported catalyst was dried at an oven of 110° C. for 10 hours or more and sintered in a sintering furnace at 1,000° C. for 4 hours. The sintered catalyst thus prepared contained 10 wt % of potassium phosphate, based on the weight of the alpha-alumina, as presented in Table 2 below.

Comparative Example 4

A sintered catalyst was prepared in the same manner as in Comparative Example 3 except that 17.3 g of potassium phosphate hydrate was used as the precursor of potassium phosphate. The sintered catalyst contained 15 wt % of potassium phosphate, based on the weight of the alpha-alumina, as presented in Table 2 below.

Comparative Example 5

A sintered catalyst was prepared in the same manner as in Comparative Example 3 except that 21.8 g of potassium phosphate hydrate was used as the precursor of potassium phosphate. The sintered catalyst contained 20 wt % of potassium phosphate, based on the weight of the alpha-alumina, as presented in Table 2 below.

Experimental Example 1

Ethylene and propylene were produced using the catalysts of Examples 1 through 5 and Comparative Examples 2 through 5 according to the following manner. At this time, naphthas were used as hydrocarbons for steam cracking and the compositions and physical properties of naphthas are summarized in Table 1 below.

TABLE 1

| | | Physical property | | | | |
|---|---|---|---|---|---|---|
| | Initial | Terminal | | | | |
| | boiling | boiling | Composition (wt %) | | | |
| Density | Point | Point | n- | | | Aro- |
| (g/cc) | (° C.) | (° C.) | paraffin | 1-paraffin | Naphthene | matics |
| 0.675 | 30.9 | 160.7 | 39.5 | 38.9 | 15.3 | 6.3 |

Naphthas and water, which were used as reactants, were supplied in a reactor via a quantitative pump. At this time, naphthas and water were used in a ratio of 2:1 (by weight) and the flow rate (LHSV) of naphthas was set to 10 hr$^{-1}$. Naphthas and water which had been supplied in the reactor were mixed via an evaporator, heated to 550° C. in a primary preheater and then to 650° C. in a secondary preheater, and injected into a quartz reactor (length: 45 cm, diameter: ⅜ inch) packed with a catalyst.

The quartz reactor was heated to 880° C. by a three-stage electric furnace. Mixtures of steam and naphthas that had passed through the secondary preheater were subjected to contact cracking in the quartz reactor. While passing through two condensers serially connected, water and heavy oils were condensed into a liquid phase and recovered, and vapor mixtures were discharged out after online gas chromatography. The yield of ethylene was calculated by the following Equation 1. The yields of other products (propylene) were also calculated in the same manner.

Yield of ethylene (wt %)=Production amount of ethylene/supply amount of naphthas×100     [Equation 1]

The results of contact steam cracking and non-contact steam cracking of naphthas are presented in Table 2 below. After the reaction terminated, cokes formed on lower portions of catalyst beds containing a relatively high level of cokes were collected and quantified. The yields of ethylene and propylene were expressed as wt % based on the supply amount of naphthas for the reaction of 4 hours. The amount of cokes was expressed as wt % based on the weight of the catalysts recovered after reaction termination.

Comparative 5 Example 1 in which non-catalytic cracking was performed. The yields of ethylene and propylene of Examples 1-3 were similar to those of Comparative Example 2 in which potassium vanadate and boron oxide were used as catalyst components and Comparative Example 4 in which potassium phosphate was used as a catalyst 10 component. However, the amount of cokes formed on the catalysts of Examples 1-3 was remarkably reduced by 56-80 wt % and 4-57%, respectively, as compared to those of Comparative Examples 2 and 4. A use of a higher sintering temperature in preparation of the catalysts of Examples 1-3 did not increase the yield of 15 ethylene and propylene but reduced significantly the amount of cokes deposited on the catalysts. However, sintering over 1,400° C. may melt KMgPO$_4$, resulting in loss of KMgPO$_4$.

Effects according to change in content of a catalyst

Effects according to change in content of a catalyst component are also presented in Table 2 above. In connection with the catalysts of Examples 4-5, as the content of KMgPO$_4$ increased, the yield of ethylene and propylene was insignificantly changed but the amount of cokes formed on the catalysts was remarkably reduced. However, in a case where an alumina carrier with a surface area of 0.1 m$^2$/g or less is used, inclusion of more than 30 wt % of KMgPO$_4$ does not provide an effect corresponding to the content. As compared with the catalyst of Comparative Example 2 in which potassium vanadate and boron oxide were used as catalyst components and the catalysts of Comparative Examples 3 and 5 in which potassium phosphate was used as a catalyst component, in the same content of potassium compounds, the yields of ethylene and propylene of Examples 4-5 were similar to those of Comparative Examples 2, 3, and 5. However, the amount of cokes formed on the catalysts of Examples 4-5 was reduced by 56 wt % and 44-53 wt %, respectively, as compared to that of Comparative Example 2 and those of Comparative Examples 3 and 5.

Example 6 and Comparative Example 6-7

One of severe disadvantages of a supported potassium vanadate and boron oxide catalyst is the loss of a catalyst component during hot cracking. To evaluate the degree of the

TABLE 2

| Section | Catalyst component (wt %) | Alumina carrier (g) | Sintering temperature (° C.) | Yield of ethylene (wt %) | Yield of propylene (wt %) | Cokes formed on catalyst (wt %) |
|---|---|---|---|---|---|---|
| Example 1 | KMgPO$_4$ 15 | 100 | 1000 | 31.2 | 17.1 | 3.34 |
| Example 2 | KMgPO$_4$ 15 | 100 | 1100 | 31.4 | 17.2 | 2.50 |
| Example 3 | KMgPO$_4$ 15 | 100 | 1200 | 31.6 | 17.1 | 1.49 |
| Example 4 | KMgPO$_4$ 10 | 100 | 1200 | 31.4 | 17.2 | 3.37 |
| Example 5 | KMgPO$_4$ 20 | 100 | 1200 | 31.6 | 17.1 | 0.62 |
| Comparative Example 1 | Non-catalyst/cracking | — | — | 23.9 | 12.3 | — |
| Comparative Example 2 | KVO$_3$ 10/B$_2$O$_3$ 2 | 100 | 750 | 31.1 | 17.3 | 7.64 |
| Comparative Example 3 | K$_3$PO$_4$ 10 | 100 | 1000 | 31.6 | 17.2 | 6.04 |
| Comparative Example 4 | K$_3$PO$_4$ 15 | 100 | 1000 | 31.4 | 17.2 | 3.48 |
| Comparative Example 5 | K$_3$PO$_4$ 20 | 100 | 1000 | 31.5 | 17.1 | 2.52 |

As shown in Table 2, the yields of ethylene and propylene of Examples 1-3 in which KMgPO$_4$ was used as a catalyst component were remarkably increased, relative to those of loss of a catalyst component, each catalyst of Example 6 and Comparative Examples 6-7 was filled in a 880° C. reactor under a flow condition of 2.8 g steam/min and the amount of a catalyst component after 20 hours of the reaction was measured. The loss amount (wt %) of a catalyst component to the initial amount of 5 the catalyst component for each catalyst of Example 6 and Comparative Examples 6-7 is presented in Table 3 below.

TABLE 3

| Section | | Comparative Example 6 | Comparative Example 7 | Example 6 |
|---|---|---|---|---|
| Catalyst component | | $KVO_3/B_2O_3$ | $K_3PO_4$ | $KMgPO_4$ |
| Carrier | | Alumina | Alumina | Alumina |
| Sintering temperature (° C.) | | 750 | 1,000 | 1,200 |
| Loss amount (wt %) | K | 20 | 0 | 0 |
| | V | 20 | — | — |
| | B | 96 | — | — |

As shown in Table 3, in connection with Comparative Example 6 in which potassium vanadate and boron oxide were used as catalyst components, after 20 hours of steam cracking at 880° C., the loss amount of potassium and vanadium was about 20 wt % and almost 15 all boron was dissipated. Therefore, it can be seen that the catalyst composed of potassium vanadate and boron oxide is remarkably lost during steam cracking of hydrocarbons. However, in connection with Comparative Example 7 and Example 6 in which potassium phosphate and $KMgPO_4$ were respectively used as catalyst components little loss of the catalyst components was observed.

Example 7

$KMgPO_4$ precursor powders obtained from magnesium nitrate 5 hydrate, potassium hydroxide, and ammonium phosphate, were mixed with magnesium aluminate powders in a ratio of 2:8 (by weight). The resultant mixture was sintered at 1,300° C. in an air atmosphere for 24 hours followed by granulation to prepare a sintered catalyst.

Experimental Example 2

Ethylene and propylene were produced by steam cracking of naphthas in the presence of the sintered catalyst of Example 7 in the same manner as in Experimental Example 1 and the results are presented in Table 4 below.

TABLE 4

| Section | Comparative Example 1 | Comparative Example 2 | Example 7 |
|---|---|---|---|
| Catalyst component | Non-catalyst/cracking | $KVO_3$ 10 wt % $B_2O_3$ 2 wt % | $KMgPO_4$ 20 wt % magnesium aluminate 80 wt % |
| Carrier | — | Alumina | — |
| Sintering temperature (° C.) | — | 750 | 1,300 |
| Yield of ethylene (wt %) | 23.9 | 31.1 | 31.3 |
| Yield of propylene (wt %) | 12.8 | 17.3 | 17.1 |
| Cokes formed on catalyst after steam cracking (wt %) | — | 7.64 | 1.8 |

As shown in the results of Table 4 above, both ethylene and propylene produced using the catalyst of Example 7 exhibited an increased yield, as compared to those of Comparative Example 1 in which non-catalytic cracking of naphthas was carried out.

In comparison between Example 7 and Comparative Example 2 in which potassium vanadate and boron oxide were used as catalyst components, the yields of ethylene and propylene were similar. However, the amount of cokes formed on the catalyst of Example 7 was remarkably reduced by 24 wt %, relative to that of Comparative Example 2.

INDUSTRIAL APPLICABILITY

As apparent from the above description, when steam cracking of hydrocarbons is carried out in the presence of a catalyst including $KMgPO_4$ as a catalyst component, the yield of light olefins such as ethylene and propylene can be significantly enhanced, relative to the yield of light olefins produced by a common non-catalytic cracking process.

In addition, a catalytic hydrocarbon steam cracking process according to the present invention can remarkably reduce the amount of cokes formed on a catalyst, without affecting the yield of light olefins such as ethylene and propylene, relative to a common catalytic hydrocarbon steam cracking process. Therefore, catalyst activity can be maintained for a longer time and a pressure reduction applied to a cracker can be reduced. Furthermore, because $KMgPO_4$ has very excellent thermal stability at high temperature, a lifespan of a catalyst can be increased, and catalytic steam cracking can be performed in all of a fixed-bed reactor, a mobile phase reactor, and a fluidized-bed reactor.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing a catalyst for hydrocarbon steam cracking, which comprises:
    dissolving a $KMgPO_4$ precursor in water to prepare an aqueous solution of the $KMgPO_4$ precursor;
    impregnating a carrier with the aqueous solution of the $KMgPO_4$ precursor to prepare a supported catalyst; and
    sintering the supported catalyst under 1,000-1,400 ° C. for 22-26 hours.

2. The method of claim 1, wherein the $KMgPO_4$ precursor is prepared from magnesium nitrate hydrate, potassium hydroxide, and ammonium phosphate.

3. The method of claim 1, wherein the carrier is selected from the group consisting of alpha-alumina, silica, silica-alumina, zirconium oxide, magnesium oxide, magnesium aluminate, calcium aluminate, and zeolite.

4. A method for preparing a catalyst for hydrocarbon steam cracking, which comprises:
    mixing a $KMgPO_4$ powder or a $KMgPO_4$ precursor powder and metal oxide; and
    sintering the resultant mixture under 1,000-1,400 ° C. for 22-26 hours to obtain a sintered catalyst of $KMgPO_4$-metal oxide.

5. The method of claim 4, wherein the metal oxide is selected from the group consisting of alpha-alumina, silica, silica-alumina, zirconium oxide, magnesium oxide, magnesium aluminate, calcium aluminate, and zeolite.

6. A method for producing olefins by steam cracking of hydrocarbons, wherein the method comprising;
    providing hydrocarbons for steam cracking;
    contacting the hydrocarbons with a catalyst, wherein the catalyst is KMgPO$_4$ catalyst supported on a carrier, wherein the catalyst is obtained by sintering KMgPO$_4$ and the carrier under 1,000-1,400 ° C. for 22-26 hours, and wherein the concentration of KMgPO$_4$ in the catalyst is in a range of 0.5-30 wt % based on the total weight of the catalyst; and obtaining olefins, wherein the olefins include ethylene having a range of 31.2 to 31.%, prophylene having a range of 17.1 to 17.2%, and cokes formed on a surface of the catalyst having a range of 0.62 to 3.37%.

7. A method for producing olefins by steam cracking of hydrocarbons, wherein the method comprising;

providing hydrocarbons for steam cracking;

contacting the hydrocarbons with a catalyst;

wherein the catalyst is KMgPO$_4$ catalyst, wherein the catalyst is obtained by sintering a KMgPO$_4$ powder or a KMgPO$_4$ precursor powder and a metal oxide under 1,000-1,400° C. for 22-26hours, and wherein the concentration of KMgPO$_4$ in the catalyst is in a range of 0.5-50 wt % based on the total weight of the catalyst; and obtaining olefins, wherein the olefins include ethylene having a range of 31.2 to 31.6%, prophylene having a range of 17.1 to 17.2%, and cokes formed on a surface of the catalyst having a range of 0.62 to3.37%.

8. The method of claim 7, wherein the steam cracking is carried out at a reaction temperature of 600-1,000° C., a weight ratio of steam/hydrocarbons of 0.3-1.0, and LHSV (Liquid Hourly Space Velocity) of 1-20 hr$^{-1}$.

9. The method of claim 7, wherein the steam cracking is carried out in a reactor selected from the group consisting of a fixed-bed reactor, a fluidized-bed reactor, and a mobile phase reactor.

10. The method of claim 7, wherein the catalyst is regenerated by removal of cokes formed on a surface of the catalyst at 500-1,300° C. in the presence of air, steam, or a mixture thereof after the steam cracking.

11. The method of claim 6, wherein the steam cracking is carried out at a reaction temperature of 600-1,000° C., a weight ratio of steam/hydrocarbons of 0.3-1.0, and LHSV (Liquid Hourly Space Velocity) of 1-20 hr$^{-1}$.

12. The method of claim 6, wherein the steam cracking is carried out in a reactor selected from the group consisting of a fixed-bed reactor, a fluidized-bed reactor, and a mobile phase reactor.

13. The method of claim 6, wherein the catalyst is regenerated by removal of cokes formed on a surface of the catalyst at 500-1,300° C. in the presence of air, steam, or a mixture thereof after the steam cracking.

* * * * *